Sept. 8, 1959     H. ZIEBOLZ     2,903,007
COMPENSATION OF BACK PRESSURE VARIATION
IN DISCHARGE TYPE REGULATORS
Filed April 28, 1950     2 Sheets-Sheet 1

HERBERT ZIEBOLZ
INVENTOR.

BY

ATTORNEYS

Sept. 8, 1959    H. ZIEBOLZ    2,903,007
COMPENSATION OF BACK PRESSURE VARIATION
IN DISCHARGE TYPE REGULATORS
Filed April 28, 1950    2 Sheets-Sheet 2

HERBERT ZIEBOLZ
INVENTOR.
BY
ATTORNEYS

United States Patent Office 2,903,007
Patented Sept. 8, 1959

2,903,007

COMPENSATION OF BACK PRESSURE VARIATION IN DISCHARGE TYPE REGULATORS

Herbert Ziebolz, Chicago, Ill., assignor to GPE Controls, Inc., a corporation of Illinois Application April 28, 1950, Serial No. 158,857

5 Claims. (Cl. 137—83)

The present invention relates to relay systems and particularly to fluid-powered relay systems of the type wherein fluid is supplied to a regulator device at a relatively high pressure and at the regulator is discharged to a region of relatively low pressure or exhaust, with development of a signal-controlled output force as an incident of the pressure drop of the fluid between the region of high pressure and the region of low pressure.

One principal general type of fluid regulator for such relay systems is that in which the output force is regulated by signal-responsive control of the rate of discharge of the fluid, an intermediate pressure being developed that is variable with the discharge rate, and which may be compared against either the supply or the exhaust pressure by exerting it and the pressure to which it is compared respectively upon the opposite sides of the movable wall of an expansible chamber motor. By such an arrangement the force developed by the output of the motor is varied with the intermediate pressure controlled by the signal. A second general type of regulator for such relay systems is that wherein the fluid is discharged at a constant rate to an output or power unit designed to develop an output force from kinetic energy of the fluid as it is discharged, regulation of the output force being accomplished by signal-controlled variation of the amount of kinetic energy usefully delivered to the force-developing output device or power unit. Regulators of the general kind, operating to develop controllable output forces as an incident to pressure drop in fluid between a region of high pressure and a region of low pressure, have in prior practice had the inherent characteristic of sensitivity to variations in back pressure that is exerted against discharge of fluid from the high pressure supply to the low pressure or exhaust region. This characteristic has heretofore unduly limited fields of application of such regulators. In general, atmospheric pressure has been relied upon to maintain a substantially constant static pressure of the region of relatively low pressure, and a substantially constant differential between the two regions has been maintained by regulating the supply to maintain a constant static pressure at the high pressure or supply region, so that a constant magnitude of back pressure is exerted by the atmosphere against the fluid discharge.

A typical regulator of the first kind is the so-called "flapper" arrangement wherein a valve element is movable by a signal relative to an outlet orifice of a variable pressure chamber wherein the fluid pressure is intermediate the supply and exhaust pressures, so that the position of the valve element determines the rate of discharge from such chamber and thereby the differentials between it and the supply and exhaust pressures. It will be apparent that if the static pressure to which the intermediate chamber pressure exhausts is subject to variation, the differential between the intermediate chamber pressure and the pressures of supply and exhaust will be varied by variations of the back pressure exerted by the static pressure of the exhaust region against discharge from the intermediate chamber, as well as by the intended control of such differentials by change of position of the signal actuated valve member.

A typical regulator of the second type, wherein an output force is developed as an incident to fluid discharge from a region of relatively high pressure to a region of relatively low pressure by controlling the level of kinetic energy of the fluid so discharged that is usefully applied to a power unit, is the so-called "jet pipe" regulator. Such a regulator comprises a receiver having therein a port arrangement that constitutes the input to the motor assembly, normally of expansible chamber type, and a jet pipe is arranged to swing relative to the port arrangement, as positioned by signal magnitude, to change the level of kinetic energy absorbed by the power unit from a fluid stream discharged by the jet pipe and translated by the power unit into an output force. In the most usual arrangement the receiver is provided with a pair of closely adjacent receiver ports connected to the two inputs of a differential pressure responsive device, typically a cylinder and piston assembly, the jet pipe being arranged to swing from a neutral position of equal registration with the ports to actuating positions of unequal registration. The jet pipe is supplied with fluid under pressure and at a volume rate to give to the stream discharged by the pipe considerable velocity and substantial kinetic energy, so that a pressure is developed in each port that receives part of the fluid, the magnitude of such pressure in theory depending solely on the degree of registration of the jet pipe with such port and therefore varying with magnitude of the deflection of the jet pipe from its neutral position, but actually depending also on the back pressure exerted against stream discharge by pressure of the region surrounding the orifice of the jet pipe. Obviously the kinetic energy of the stream and the magnitude of pressure developed in a receiver port by part of the stream received by such port depend in part on the velocity of the fluid of the stream as it reaches the port. Velocity in turn depends on magnitude of difference between the pressure at which the fluid is delivered to the jet pipe discharge orifice and the back pressure of the medium that surrounds the exterior of the jet pipe and particularly the output of the discharge orifice. Accurate relation of the pressure developed in the port to degree of registration of the jet pipe with the port, or in the two port form, accurate relation of magnitude of pressure differential between the two ports to degree of deflection of the jet pipe from its neutral position, depend both on a constant level of kinetic energy content, or a constant velocity of the stream as it reaches the receiver structure, and consequently on a constant magnitude of back pressure exerted against stream discharge.

Heretofore the necessary maintenance of the energy level of the jet stream has been accompanied by supplying fluid to the jet pipe at a constant pressure and discharging the jet pipe to a region of atmospheric pressure to which the ports also are exposed, atmospheric pressure having been regarded as being sufficiently constant for satisfactory maintenance of jet stream velocity and energy. In such arrangements, gravity drainage has been relied upon to remove the fluid, spent after having delivered its energy content at the receiver structure, from the jet pipe discharge orifice and receiver port region to prevent irregular or material interference with the jet stream by such fluid.

Discharge of the jet stream fluid against atmospheric pressure has limited use of relays of the jet pipe type to situations productive of only negligible change of back pressure exerted by the atmosphere. Gravity drainage additionally has limited use of relays of this kind to situations where it could be relied upon for effective and uniform removal of spent fluid from the region of the jet stream. In aviation, for example, use of prior jet pipe arrangements is impractical, both on account of substantial variations in atmospheric pressure and on account of acceleration forces often exceeding gravity force and preventing reliable drainage by gravity. The prior type of arrangement also has involved mounting the jet pipe and receiver structures in quite massive casings of sufficient height to provide collection sumps well below the level of the jet stream.

Obviously the field of useful employment of jet pipe relays can materially be extended by eliminating the necessity for discharging against a constant back pressure, and further extended by elimination of gravity drainage. According to a specific application, the present invention is directed to the problem of providing a jet pipe regulator arrangement that is fully and accurately operable under conditions of varying pressure exerted as back pressure of varying magnitude against discharge of the jet stream. The invention further is directed to elimination of gravity drainage of spent fluid from the jet stream region, which is made possible by eliminating necessity of discharge against atmospheric pressure. Certain auxiliary advantages accompany the solution of these problems, such as adaptation of the relay to much more compact and light weight construction than has heretofore been possible.

Referring to both general types of regulator mentioned above, in a primary aspect, that of eliminating necessity of fluid discharge against atmospheric or even against constant back pressure, the invention may be regarded in two ways; as providing for supply to the inlet of the regulator and discharge from its outlet to exhaust at a rate that is maintained constant in spite of variations in back pressure that tend to disturb such rate; or as providing for adjustment of the pressure at which fluid is delivered to the regulator to maintain a constant differential between such delivery pressure and a variable back pressure exerted by the medium in the region to which the fluid is finally discharged from the regulator. Fundamentally the two are the same since a constant volume rate of supply results in a differential of constant magnitude between supply and back pressures, variations of the latter being reflected by equal variations of the former.

A convenient and highly advantageous, but not exclusive arrangement for practicing the invention comprises enclosing in a chamber the region of relatively low pressure to which the fluid is discharged. Since atmospheric pressure is not relied upon to maintain a reasonably constant back pressure, the chamber may be sealed to eliminate effects of a surrounding medium or atmosphere upon relay operation. A further convenient mode of practicing the invention in relay systems wherein the pressure fluid is liquid, again not necessary but in certain respects advantageous because it eliminates necessity of reliance upon gravity for drainage of spent fluid from the regulator discharge, is to maintain a chamber surrounding the regulator discharge filled with spent fluid, a practice that is rendered entirely feasible by freedom of the regulator from adverse effects of varying back pressure exerted against discharge, and in the jet pipe regulator additionally avoiding possible irregular interference with the jet stream by variations in liquid level or surges in a partially filled chamber.

A primary object of the invention is the provision, in fluid pressure powered relays including regulators that develop signal-controlled output force as an incident to pressure drop developed by discharge of pressure fluid from a supply region of relatively high pressure to an exhaust region of low pressure, of means for avoiding effects on the output force by variation in back pressure exerted against fluid discharge by pressure in the low pressure region, and to arrange these means to be effective regardless of whether the static pressure of the low pressure region is or varies between positive, negative or zero conditions relative to the normal pressure of the supply to the regulator.

A very important object of the invention is to provide a jet pipe relay system capable of effective and accurate operation under conditions of varying back pressure exerted against discharge of the jet stream by the jet pipe.

Another object is the provision of a novel arrangement for maintaining a constant pressure differential between supply and exhaust regions of fluid relay regulators of the constant discharge types described, regardless of variations in back pressure exerted by the latter region against discharge of fluid from the supply region.

Another object is the provision of a novel jet pipe hydraulic relay arrangement including means for controlling volume rate of supply to the jet pipe for maintaining constant velocity of a jet stream in spite of conditions of varying back pressure exerted against its discharge.

Still another object is the provision of a novel pressure fluid powered relay regulator arrangement, that permits the exhaust region of the regulator to be enclosed in a sealed chamber provided with an exhaust.

A further object is the provision of a pressure liquid powered relay regulator arrangement that permits the regulator discharge to be maintained immersed in a body of spent fluid.

An additional object is the provision of a novel system arrangement of fluid powered relay regulators capable of accurately relating magnitude of output force developed by power units controlled by the regulators to magnitude of signals applied to the regulators.

Figure 1:
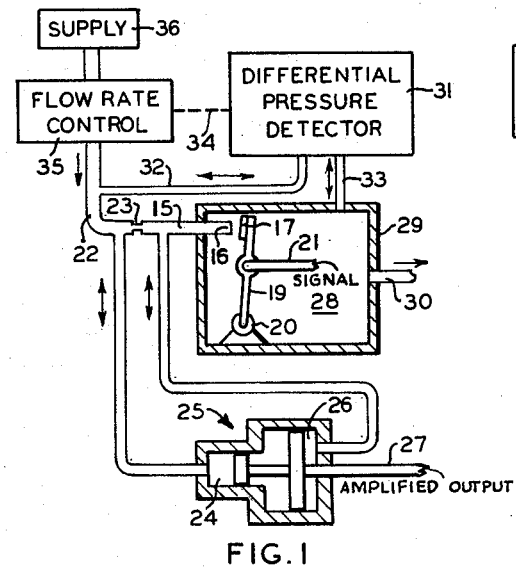
Fig. 1 is a diagram, partly in block form and partly schematic, disclosing one embodiment of the invention applied to a relay wherein the regulator is of the controlled discharge rate type.
Figure 3:
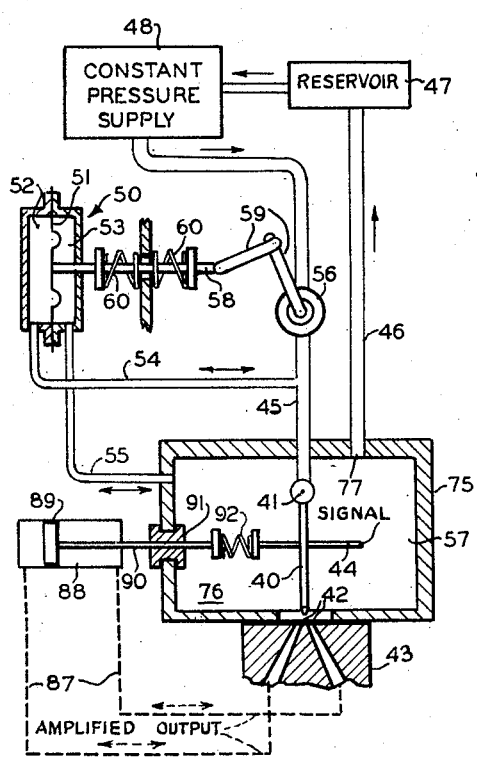
Figs. 3 and 4 are diagrams, partly in block form and partly schematic, respectively showing two other embodiments of the invention, each applied to a jet pipe regulator.
Figure 4:
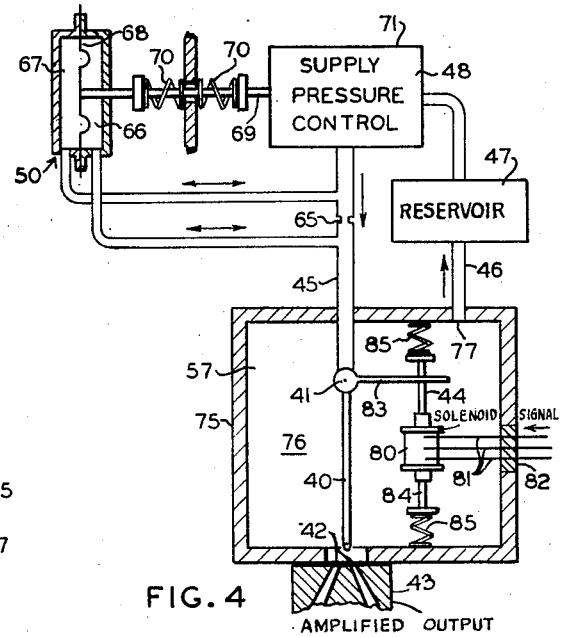
Figure 5:
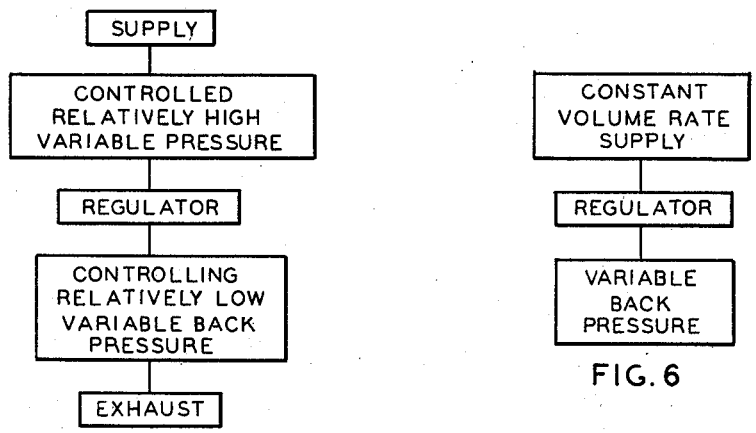
Fig. 5 is a block diagram disclosing the most basic aspect of the invention.
Figure 8:
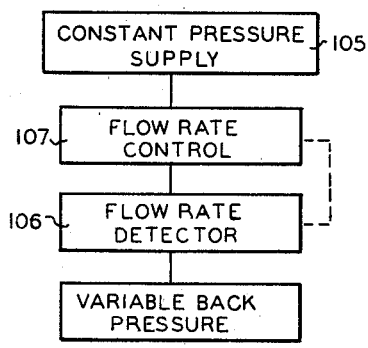
Figure 9:
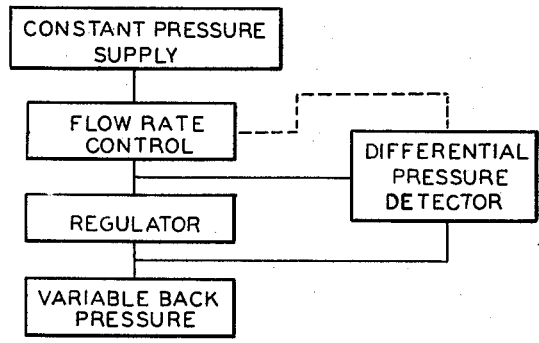

Figs. 8 and 9 are block diagrams respectively disclosing the basic systems of the embodiments of Figs. 1, and 3 and 4.

Figure 2:
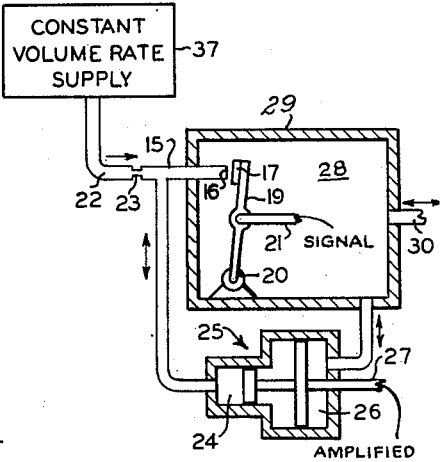
Fig. 2 is a similar diagram disclosing a modified form of the invention applied to a somewhat differently arranged regulator of the same general type as that of Fig. 1.

Describing the drawings in detail and first referring to Figs. 1 and 2, fluid powered relay regulators are shown as comprising a pressure chamber 15, which may be enclosed by an end portion of a pipe, and having a discharge orifice 16 formed by the end of such pipe. Cooperative with discharge orifice 16 is a so-called "flapper" or valve element 17 that is movable relative to the orifice to regulate rate of discharge from it to an external region surrounding it. The valve element 17 is shown as arranged to control discharge rate from the orifice by variation of clearance between its front surface and the surface defining the orifice, the element 17 being shown as mounted on a swingable arm 19 pivoted to suitable supporting structure 20. The valve element may be positioned by an axially movable signal rod 21. The showing of the arrangement is highly schematic and many well-known specific physical structures are arranged to perform equivalent functions.

Chamber 15 is supplied with fluid under pressure by a conduit 22, a restriction 23 serving to produce a drop between the supply pressure of fluid in conduit 22 and the controlled pressure in chamber 15. As shown in Fig.

1, the pressure differential across restriction 23 may be used for development of output force, or as shown in Fig. 2 the pressure drop across the variable discharge orifice 16 may be used for such purpose. To this end the higher pressure, that of conduit 22 in Fig. 1 and that of intermediate chamber 15 in Fig. 2, may be applied to the smaller cylinder 24 of a differential cylinder and piston assembly 25 which constitutes the power unit of the relay. To the larger cylinder 26 of unit 25 is applied the lower pressure, that of intermediate chamber 15 in Fig. 1 and that of discharge chamber 28 in Fig. 2. The power unit arrangement, which is well-known, has been selected for this disclosure principally because of its simplicity and many equivalent devices are equally well-known. In the power unit shown, so long as the products of the areas of the working faces of the respective pistons and the pressures applied to them respectively are equal the piston assembly develops no resultant force, an unbalance of such products resulting in exertion of force by the piston toward the side having the lower product value. Output force may be delivered conventionally by a piston rod 27.

The conventional practice of supplying fluid to relays of the general type disclosed by Figs. 1 and 2 has been to maintain constant static pressure at which fluid is supplied to the regulator input, in Figs. 1 and 2 the conduit 22, and to provide for discharge from chamber 15 through orifice 16 to atmospheric pressure. Obviously variation in magnitude of back pressure exerted against discharge of fluid through orifice 16, other than that caused by movement of element 17 will cause a variation of pressure differential across restriction 23, disturbing the highly desired accurate proportional relation between magnitude of output force developed by power unit 25 and magnitude of a signal applied through rod 21 to position valve element 17.

The embodiment of the invention disclosed by Fig. 1 comprises means for maintaining a constant pressure drop between input conduit 22 and the region to which orifice 16 discharges, the latter being designated 28 and shown as a chamber enclosed by a casing 29 having an exhaust 30. The specific arrangement disclosed by Fig. 1 comprises a differential pressure measuring device 31 of a kind having two pressure inputs or signal pipes 32, 33 and capable of producing an output signal the magnitude of which is determined by magnitude of differential between pressures applied to such inputs. Many such devices are known and a specific arrangement of such a device is shown in Fig. 3 and will be described subsequently. In Fig. 1 the input pipes 32, 33 respectively are connected to conduit 22 and chamber 28, to measure magnitude of difference in pressures of fluid in such pipe and chamber. The signal output of the differential pressure measuring device 31 is applied by a mechanical transmission 34 to the control input of a flow rate control 35 that responds to signals produced by device 31 to so control the volume flow rate of fluid supplied to conduit 22 from a primary supply source 36 as to maintain constant the difference in pressures of fluid in the conduit 22 and chamber 28. By this arrangement any variation in static pressure of fluid in chamber 28, and consequent variation in back pressure exerted against discharge of fluid to chamber 28, and a reflecting variation of pressure in chamber 15, instead of resulting in a change of differential pressure applied across the piston assembly of power unit 25 and false operation of such assembly, is compensated by an equal change of the supply pressure of conduit 22. Thereby magnitude of differential between pressures of conduit 22 and chamber 15 is made subject to variation solely by control exerted through positioning of valve element 17.

In the system of Fig. 2, wherein magnitude of differential in pressure of intermediate pressure chamber 15 and exhaust chamber 28 is applied to power unit 25 to develop output force, the back pressure exerted by fluid in chamber 28 against fluid discharge by orifice 16 is used as a reference for adjusting magnitude of pressure at which fluid is supplied to the regulator input, the pressure of fluid in conduit 22, to maintain the latter automatically at a preselected level above the back pressure.

To this end, fluid is supplied to conduit 22 by a device 37 capable of maintaining volume rate of such supply at a constant level in spite of variations in back pressure exerted by fluid in exhaust chamber 28. By such constant volume rate of supply, any variation in back pressure against fluid discharge is reflected by a corresponding and equal change of pressures in conduit 22 and intermediate chamber 15, and magnitude of differential between the latter and the pressure of fluid in chamber 28 is determined solely by the position of valve element 17 relative to discharge orifice 16.

Referring to Figs. 3 and 4, each discloses a jet pipe fluid relay regulator comprising a jet pipe 40 pivoted to swing about an axis 41 in the direction of spacing between a pair of distributor or receiver ports 42 that open in the face of a receiver manifold 43. A signal rod 44 may be employed for swinging the jet pipe about its pivot axis from a neutral position wherein its discharge orifice is in equal registration with the two ports 42, into actuating positions wherein its registration with the respective ports is increased and decreased substantially in direct and inverse proportion to degree of its deflection, so that unequal portions of the jet stream discharged by the jet pipe are received by the ports, and pressure differential is thereby developed between them. Such differential in pressures may be used for actuating a power unit.

As so far described, the relay is conventional, being disclosed among many others by United States patents to Herbert Ziebolz, No. 2,132,338, October 4, 1938, No. 2,222,551, November 19, 1940, No. 2,227,170, December 31, 1940 and United States patent Frank Neukirch, No. 2,228,015, January 7, 1941. As suggested by United States patent to Herbert Ziebolz, No. 2,312,564, March 2, 1943, for large power amplification the receiver ports may be in a movable auxiliary piston that operates a pilot valve, rather than in a stationary distributor manifold and connected direct to the power unit.

According to one of its aspects, the invention resides in maintaining a constant jet stream velocity and kinetic energy content. From one point of view this may be accomplished by maintaining at constant magnitude the differential between pressure at which fluid is supplied to the jet pipe 40 and the pressure, which here is assumed to be variable, of any medium surrounding the jet pipe discharge orifice and against which the jet stream is discharged by the effect of the supply pressure. In its simplest form the invention resides in supplying the fluid to the jet pipe at a volume rate that positively is maintained constant in spite of variations in pressure of the medium surrounding the jet pipe discharge orifice. In this way velocity and kinetic energy of the jet stream are maintained constant by the volume rate of supply, and pressure differential of constant magnitude is maintained across the jet pipe discharge orifice, since the constant volume rate of discharge through such orifice necessitates that any variation in back pressure exerted against such discharge be reflected in equal and corresponding variation in pressure at which the fluid is supplied to the orifice. In Figs. 3 and 4, and in accordance with this interpretation of the mode of operation of the invention, the jet pipes 40 are shown as supplied by constant volume rate fluid supply systems through supply lines 45 that include means permitting both fluid supply and swinging of the jet pipes about their axes 41.

The fluid circuits of Figs. 3 and 4 are completed by exhaust lines 46 and supplies of operating fluid contained in reservoirs 47 to which lines 46 return the spent fluid and from which supply devices 48 draw fluid for supply to the jet pipes. While gravity drainage, as described above, brings disadvantages in certain situations, the maintenance of constant jet stream velocity at present being described does not preclude employment of gravity drainage nor does it preclude gravity return flow to a reservoir for containing a supply of operating fluid.

Fig. 3 discloses a specific arrangement of the invention as applied to a jet pipe relay system. As suggested above, the problem of maintaining a constant velocity and a kinetic energy content of the jet stream may be regarded as involving either maintenance of a constant volume rate of supply to the jet pipe to maintain a constant pressure drop across the orifice against varying back pressure, or as involving adjustment of flow rate to compensate variations in the pressure drop caused by such back pressure variation. Also as suggested above, either approach results as a practical matter in maintenance of both constant flow rate of supply and constant magnitude of pressure drop. Consequently, in addition to maintenance of the constant pressure drop by positive constant volume rate of supply, such constant drop can be maintained by measuring it, either directly or by measuring it indirectly through measurement of flow rate, and adjusting either a variable rate fluid supply device or a device controlling the flow path from a constant pressure supply device, in either case the adjustment of the flow rate of supply being of a nature to correct tendencies of the pressure drop to depart from its selected magnitude. Here again differences of mode of operation are primarily in language, since magnitude of flow rate affords a measure of differential pressure developed by the flow and vice versa.

In Fig. 3, measurement is accomplished by a device 50, conventionally designated a flow rate detector but which may perform its detecting function by measuring differential pressure developed across a restriction by the flow the rate of which it is to detect. The detector comprises a movable wall, as deflectable diaphragm 51, separating enclosed chambers 52, 53 that are respectively connected by lines 54, 55 with the supply line 45 between a flow rate controlling valve 56 and jet pipe 40, and with space 57 occupied by the medium surrounding the jet pipe discharge orifice and against the pressure of which the jet stream is discharged. An axially movable operating rod 58 and linkage 59 connect the diaphragm for actuating flow control valve 56. Means for biasing valve 56 and diaphragm 51 to a selected position representative of a desired velocity of jet stream, supply flow rate, or differential between supply and power pressures may comprise a system of return springs 60 assembled to act on rod 58. The arrangement is such that when differential pressure developed across the discharge orifice of the jet pipe, that is to say, between pressure of fluid in supply pipe 45 and that in space 57, departs from the magnitude for which the system is set by the adjustment of loading springs 60, diaphragm 51 will actuate valve 56, adjusting the flow rate to correct the differential pressure magnitude measured by the position of the diaphragm.

In the arrangement of Fig. 4 flow rate is measured by differential pressure, developed by flow of fluid in a supply line 45 to jet pipe 40, across a flow restriction 65 in supply line 45. Downstream and upstream of the restriction 65, line 45 is in communication with enclosed chambers 66 and 67 separated by a movable wall, shown as a flexible diaphragm 68, which actuates an output rod 69 that is biased by a spring system 70 to a selected neutral position, such position being representative of a selected magnitude of pressure differential across restriction 65, which differential corresponds to a selected jet stream velocity, rate of supply to jet pipe 40 or magnitude of pressure drop across the discharge orifice of the latter. Rod 69 actuates a supply control device 71, which may be a control valve such as 56 of Fig. 3 in series with a constant pressure supply device, or which device 71 may be a variable rate delivery device with a delivery rate control element actuated by rod 69.

Arrangements of the types disclosed by Figs. 3 and 4 are capable of supplying operating fluid at constant rates unaffected by variation of back pressure exerted against jet discharge, and so maintain constant the velocity and kinetic energy of the jet streams.

The above disclosed system arrangements for avoiding the requirement for jet pipe discharge against a constant static pressure eliminate the necessity of discharge of the jet stream to a region of atmospheric pressure. Consequently the jet pipe and receiver port arrangements may be enclosed in a chamber sealed from a surrounding atmosphere or medium, and the entire fluid system may be maintained under any desirable condition of static pressure without in any way being affected by variation of the static pressure of such surrounding atomosphere or medium. Thus Figs. 3 and 4 show casing structures 75 enclosing chambers 76 that may be completely sealed from a surrounding atmosphere or medium. Exhaust openings 77 to which are connected fluid exhaust or return lines 46 are shown as being in the top walls of the casing structures 75. The casing top arrangement of exhaust openings is not necessary, but is regarded as desirable to maintain the chambers 76 filled with spent liquid. Such maintenance of the chambers filled with liquid prevents irregular interference with the jet stream by liquid of changing depth in a partly filled chamber, which might result from non-uniform withdrawal of liquid from the chamber, and also prevents such interference by surging or by improper functioning of gravity drainage, which may result from acceleration conditions or changes of position of the assembly. These expedients, enclosing the regulator in a sealed chamber, and maintaining such chamber filled with spent liquid, are not necessary to maintenance of a constant jet stream velocity against varying back pressure, but rather are permitted by it.

Enclosure of a highly sensitive fluid relay regulator in a chamber, particularly in a chamber sufficiently sealed to permit it to be maintained filled with fluid, and/or at a pressure level substantially different from that of a surrounding medium, involves the problem of imposing on the regulator signal input member a mechanical signal, such as a force or a position of a movable signal element, from the exterior of the casing structure enclosing such chamber. Normally such signals as are used to actuate these regulators are at force levels of magnitudes insufficient to overcome frictional resistance of adequate stuffing box packings or resistance to deflection of flexible wall seals. An ideal way of avoiding necessity of mechanical transmission of a signal through a wall of a casing such as 29 of Figs. 1 and 2 or 75 of Figs. 3 and 4, is presented by electrical signal means capable of exerting a force of magnitude proportional to magnitude of variable electric current or voltage energizing it. As suggested by Fig. 4, application of a signal to the regulator input member, jet pipe 40 in Fig. 4, may be made electrically by means of a solenoid having a directional characteristic, such as a solenoid assembly comprising a pair of selectively energizable windings. In Fig. 4 such a solenoid is designated 80 and is enclosed in chamber 76, being energized by means of electrical leads 81 passed through a seal arrangement 82. A suitable mechanical system applies to the jet pipe a positioning signal corresponding to magnitude of energization of the solenoid and exerted in a direction depending on the identity of the energized winding. Such mechanical system may comprise a lever 83 having one arm linked to the jet pipe and the other to signal rod 44 which is connected to solenoid armature 84, and a biasing spring arrangement 85 for returning the jet pipe to its neutral position in the absence of energization of the solenoid. Translation of any type of signal to a solenoid-energizing current of proportional magnitude is readily accomplished by well-known means.

In relay regulator practice it is usual to apply to the regulator control member a power unit response-representing proportioning signal, exerted on the control member in opposition to the primary signal that tends to deflect the member for actuating the power unit in response to such primary signal. Such an arrangement is devised to return the control member to its neutral position when response of the power unit has reached a predetermined proportional relation to the magnitude of the primary signal that initiated such response. Normally such proportioning signals, being taken from the output side of an amplified power unit of the relay, have quite high force levels and so may be introduced into a sealed chamber enclosing the regulator through conventional motion-permitting seals. Fig. 3 discloses an arrangement of this kind. In this system the respective receiver ports 42 are indicated as coupled, through means represented by dotted lines 87, to control differential between pressures in opposite ends of a cylinder 88 and exerted against opposite faces of a piston 89. Piston 89 may be the power unit of the system or it may be a stabilizing or proportioning signal-generating piston in an arrangement such as one of those disclosed by United States patents to Herbert Ziebolz, No. 2,227,170, December 31, 1940 and No. 2,312,464, March 2, 1943. Since in either case piston 89 has a relatively high level of output force, a signal of a magnitude proportional to distance of its movement in response to a given degree of jet pipe deflection may be exerted on the jet pipe by mechanical means such as an axially movable rod 90 extended through a seal in a wall of casing structure 75 such as a stuffing box 91. Movement of rod 90 may be translated by a spring 92 into a proportional force variation exerted to return the jet pipe to neutral position against a primary force signal exerted to deflect the jet pipe from such position.

The block diagrams, Figs. 5 to 9 are presented to emphasize that the invention resides in a fundamental type of system arrangement rather than in specific combination of particular elements, and that there are two general system arrangements that conform to the basic principle of system arrangement. As suggested by Fig. 5, the fundamental characteristic of the invention, wherein it departs from conventional prior practice, resides in variation of the pressure of fluid supply to the regulator in response to either variation in back pressure exerted by the low pressure region against exhaust fluid from the regulator, or variation in static pressure of the latter region. This controlled variation of the high pressure, as distinguished from the prior practice of maintaining it at a constant magnitude and relying on an assumed constant back pressure being exerted by the low pressure region, relieves fluid powered relay systems of the limiting characteristics noted above, which generally can be summarized as heretofore preventing effective use of such systems in situations productive of varying back pressures.

Figure 6:
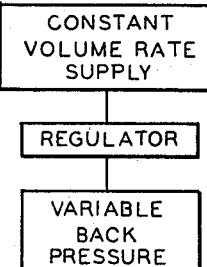
Fig. 6 is a block diagram of one form of the invention of which Fig. 2 discloses a specific embodiment.
Figure 7:
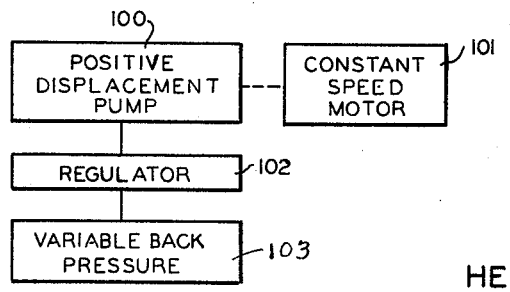
Fig. 7 is a block diagram disclosing a more specific arrangement of the embodiment of the invention of Figs. 2 and 6.

The two general arrangements herein disclosed for accomplishing the variation of the high pressure as a consequence of back pressure variation respectively are disclosed in block form by Figs. 6 and 8. In Fig. 6 the constant volume rate supply method corresponds to the system of Fig. 2 and may equally well be applied to a jet pipe regulator. A simple and effective means of accomplishing this mode of operation is shown by Fig. 7, wherein a positive displacement pump 100 is driven by a constant speed motor 101 thereby to deliver fluid at a constant volume rate in spite of variations in back pressure exerted against its output. The output of pump 100 being supplied to regulator 102, which may be of either of the general types described above, the output of the power unit actuated by the regulator is responsive to the control signal applied to the regulator, and is not affected by variations in back pressure exerted by the exhaust region 103.

The second general mode of operation in performing the invention is accomplished by an arrangement disclosed by Fig. 8 which discloses in block form the arrangements of Figs. 1, 3 and 4. This type of system comprises a supply source 105, a detector 106 which detects rate of flow of fluid supplied to a regulator by source 105 and operates a flow rate control 107 to adjust rate of flow to the regulator to maintain a constant pressure drop across it in spite of variations in back pressure exerted against discharge of fluid to exhaust by the regulator. As has been set forth above, detection of flow rate to the regulator, may be accomplished across the regulator itself, as in Figs. 1 and 3, or it may be accomplished in the supply line to the regulator, as in Fig. 4. For this reason representation of the regulator has been omitted from Fig. 8. Since flow rate measurement may be regarded as measurement of pressure differential across a restriction, as 65 of Fig. 4, the jet pipe 40 of Fig. 3, or the restriction 23 and discharge orifice 16 of Fig. 1, and conversely since direct differential pressure measurement, as in Figs. 1 and 3, may be regarded as affording a measure of flow rate, the systems of Figs. 1, 3 and 4 all are represented by the block diagram Fig. 8. Fig. 9 is a specific representation in block form of the systems of Figs. 1 and 3.

From the foregoing the type of system arrangement comprising the invention and selections and interrelations of elements necessary to its practice will be readily apparent, and it will be evident that many variations from the specific forms and disclosures herein contained may be resorted to without departing from the invention as defined by the claims.

I claim:

1. A closed hydraulic relay system comprising casing structure enclosing a relay chamber sealed from a surrounding medium, an outlet conduit opening into said chamber, structure providing a pair of receiver ports opening into said chamber in close adjacency, a jet pipe having an orifice for discharging a stream of fluid and pivotally mounted within said chamber for swinging relative to said receiver ports to vary the relative magnitudes of pressures developed in them respectively by fluid discharged from said orifice, a system for withdrawing fluid from said outlet conduit and delivering it under pressure to said jet pipe, said system including a conduit entering said chamber and connected with said jet pipe, an expansible chamber motor including a pair of expansible chambers and a movable wall separating them, a pair of pipes respectively connecting one of said expansible chambers with said conduit and the other with the interior of said sealed chamber, a valve connected in said conduit and having a control member movable to regulate volume rate of fluid flow therethrough, and means operatively connecting said control member with said movable wall for actuation of the former by change of differential in pressures of said conduit and sealed chamber to maintain said volume flow rate and said differential at preselected magnitudes.

2. A closed fluid relay system comprising casing structure enclosing a relay chamber, a jet pipe relay arranged in said chamber and including a receiver port opening into said chamber and a jet pipe arranged to discharge within said chamber and toward said port a stream of fluid, and being pivoted to swing relative to said port for variation of pressure developed in the latter by said stream, and a fluid flow system including said casing, a conduit connected to said jet pipe for supplying pressurized operating fluid to it, a connection for exhausting fluid from said chamber, said casing, conduit and connection sealing said chamber from communication with a surrounding medium, and an orifice disposed in the path of fluid flow to said relay chamber for development, at its opposite sides and by fluid flow through it, of pressures between which the magnitude of difference is proportional to volume rate of such fluid flow, a flow rate regulator connected to said conduit and having a control member that is movable to vary volume rate of flow therethrough to the jet pipe, structure enclosing a pair of expansible chambers and a movable wall between them, a pair of pressure lines connecting the different ones of said pair of expansible chambers respectively with said flow system of opposite sides of said orifice, whereby said wall is movable by variation in volume rate of fluid flow through said orifice, bias means urging said wall to a position corresponding to a preselected volume rate of fluid supply to the jet pipe, and means operatively connecting said control member to said wall for moving the former to maintain said preselected flow rate by correcting tendencies toward flow rate variation, said orifice comprising the discharge opening of said jet pipe, and said pressure lines connect said different expansible chambers respectively to said conduit and to said relay chamber.

3. A fluid-powered relay system for supply by a source of fluid under pressure, said system comprising structure enclosing a flow path including a device for discharging fluid delivered by said source from a supply region of relatively high pressure directly to an exhaust region of relatively low pressure that is exerted against such discharge, and said structure enclosing both said regions and sealing them from communication with a surrounding medium, motor means having an expansible chamber and connecting structure having a passage entering said flow path as a branch line thereof and providing a continuously open pressure transmitting passage of constant effective cross section connecting said path with said expansible chamber, means movable in response to a signal for proportionally varying pressure transmitted to said chamber by said passage by altering a characteristic of direct fluid discharge by said device between said regions, and means for maintaining a constant pressure differential between said regions.

4. A fluid-powered relay system for supply by a source of fluid under pressure, said system comprising in combination conduit means providing a flow path for directly discharging fluid delivered by said source from a supply region of relatively high pressure to an exhaust region of relatively low pressure that is exerted against such discharge, signal responsive means for developing as an incident of direct flow of fluid from the first to the second said region an output force the magnitude of which is variable in proportional response to variation in magnitude of an applied signal, means for maintaining said output force proportional to said signal magnitude during variation in said back pressure, comprising flow restrictive means arranged in said flow path between said supply and exhaust regions and defining between said source and exhaust regions a region of variable pressure higher than the pressure of said exhaust region, detector means including a pair of pressure lines communicating respectively with two of said regions, motor means connected with said lines and operating in response to variation in the difference between magnitudes of the pressures of the respective regions to which said lines are connected, and means controlling magnitude of pressure of the higher pressure one of the regions with which said lines are connected and operated by said motor means for maintaining said difference at a preselected magnitude.

5. A fluid-powered relay system comprising conduit means having an input for connection to a source of fluid under pressure and providing a flow path for discharging fluid from a supply region of relatively high pressure directly to an exhaust region of relatively low pressure that is exerted against such discharge, signal responsive means for developing as an incident of such direct discharge an output force the magnitude of which is variable in response to variation in magnitude of an applied signal; means for preventing variation in output force as a consequence of variation in said back pressure, comprising a pair of flow-restrictive devices connected in series in said flow path between said supply and exhaust regions and providing an intermediate region of variable pressure higher than the pressure of said exhaust region, flow rate detector means including pressure lines communicating respectively with two of said regions, motor means connected with said lines for proportional operation in response to variations in difference between pressures of the different regions with which said lines respectively communicate, and means for varying the pressure of said region of higher pressure with which one of said lines communicates and responsive to variations in said difference to maintain the latter at a preselected magnitude.

References Cited in the file of this patent

UNITED STATES PATENTS

| | | |
|---|---|---|
| 1,236,793 | Warman | Aug. 14, 1917 |
| 1,904,475 | Kissing | Apr. 18, 1933 |
| 2,102,865 | Vickers | Dec. 21, 1937 |
| 2,111,964 | Crane | Mar. 22, 1938 |
| 2,132,338 | Ziebolz | Oct. 4, 1938 |
| 2,225,518 | Blasig | Dec. 17, 1940 |
| 2,227,170 | Ziebolz | Dec. 31, 1940 |
| 2,228,015 | Neukirch | Jan. 7, 1941 |
| 2,247,301 | Lesser | June 24, 1941 |
| 2,272,684 | Vickers | Feb. 10, 1942 |
| 2,304,131 | Vickers | Dec. 8, 1942 |
| 2,339,753 | Bloom | Jan. 25, 1944 |
| 2,341,257 | Wünsch | Feb. 8, 1944 |

FOREIGN PATENTS

| | | |
|---|---|---|
| 447,565 | Germany | Aug. 2, 1927 |

UNITED STATES PATENT OFFICE

CERTIFICATE OF CORRECTION

Patent No. 2,903,007 September 8, 1959

Herbert Ziebolz

It is hereby certified that error appears in the printed specification of the above numbered patent requiring correction and that the said Letters Patent should read as corrected below.

Column 6, line 39, for the patent number "2,312,564" read -- 2,312,464

Signed and sealed this 1st day of March 1960.

(SEAL)
Attest:

KARL H. AXLINE
Attesting Officer

ROBERT C. WATSON
Commissioner of Patents